US011377196B2

(12) United States Patent
Shields et al.

(10) Patent No.: US 11,377,196 B2
(45) Date of Patent: Jul. 5, 2022

(54) ADAPTIVE AIRFOILS (71) Applicant: The Boeing Company, Chicago, IL (US)

(72) Inventors: Patrick J. Shields, Mullica Hill, NJ (US); Michael D. Nevinsky, Philadelphia, PA (US)

(73) Assignee: THE BOEING COMPANY, Chicago, IL (US)

( * ) Notice: Subject to any disclaimer, the term of this patent is extended or adjusted under 35 U.S.C. 154(b) by 176 days.

(21) Appl. No.: 16/787,659

(22) Filed: Feb. 11, 2020

(65) Prior Publication Data
US 2021/0245862 A1 Aug. 12, 2021

(51) Int. Cl.
*B64C 3/44* (2006.01)
*B64C 3/52* (2006.01)

(52) U.S. Cl.
CPC . *B64C 3/44* (2013.01); *B64C 3/52* (2013.01)

(58) Field of Classification Search
CPC .................................. B64C 3/38; B64C 3/48
See application file for complete search history.

(56) References Cited

U.S. PATENT DOCUMENTS

| 1,115,291 | A | * | 10/1914 | Elliott | B64C 3/48 244/219 |
| 1,341,758 | A | * | 6/1920 | Parker | B64C 3/48 244/219 |
| 1,365,346 | A | * | 1/1921 | Schenkel | B64C 3/48 244/219 |
| 1,747,637 | A | * | 2/1930 | Larsen | B64C 3/48 244/219 |
| 3,076,623 | A | * | 2/1963 | Lyon | B64C 3/50 244/215 |
| 2010/0224734 | A1 | * | 9/2010 | Grip | B64C 3/48 244/219 |
| 2011/0017876 | A1 | * | 1/2011 | Manley | B64C 9/16 244/219 |

(Continued)

FOREIGN PATENT DOCUMENTS

| CN | 107628229 | 1/2018 |
| DE | 102014103999 | 9/2015 |
| EP | 2733063 | 5/2014 |

(Continued)

OTHER PUBLICATIONS

European Patent Office, "Extended European Search Report," issued in connection with European Patent Application No. 20212440.0, dated May 25, 2021, 10 pages.

*Primary Examiner* — Richard G Davis
(74) *Attorney, Agent, or Firm* — Hanley, Flight & Zimmerman (57) ABSTRACT

Adaptive airfoils are disclosed. A disclosed example airfoil for use with a vehicle includes first and second skins at least partially defining an exterior of a vehicle, where the first skin includes first and second pivots, and where the second skin includes third and fourth pivots, a first arm extending between the first and third pivots, where the first arm is rotatable about the first and third pivots, a second arm extending between the second and fourth pivots, where the second arm is rotatable about the second and fourth pivots, and a closeout including fifth and sixth pivots rotatably coupled to the first and second skins, respectively.

25 Claims, 8 Drawing Sheets

(56) References Cited

U.S. PATENT DOCUMENTS

2016/0159456 A1* 6/2016 Haslach ............... B64C 3/48
 244/219
2017/0106956 A1* 4/2017 De Turckheim ....... B63H 9/061

FOREIGN PATENT DOCUMENTS

FR 2445267 7/1980
GB 472567 9/1937

* cited by examiner

ADAPTIVE AIRFOILS

FIELD OF THE DISCLOSURE

This disclosure relates generally to vehicles and, more particularly, to adaptive airfoils.

BACKGROUND

Airfoils are implemented on vehicles, such as aircraft for example, to affect a degree of lift imparted thereto. In particular, an airfoil of a vehicle can significantly affect an amount of lift generated from fluid flowing over surfaces of the vehicle. As a result, aerodynamic performance of the vehicle can be greatly affected by parameters of the airfoil.

SUMMARY

An example airfoil for use with a vehicle includes first and second skins at least partially defining an exterior of a vehicle, where the first skin includes first and second pivots, and where the second skin includes third and fourth pivots, a first arm extending between the first and third pivots, where the first arm is rotatable about the first and third pivots, a second arm extending between the second and fourth pivots, where the second arm is rotatable about the second and fourth pivots, and a closeout including fifth and sixth pivots rotatably coupled to the first and second skins, respectively.

An example method of producing an adaptive airfoil for use with a vehicle includes placing a first arm between a first pivot of a first skin and a second pivot of a second skin, where the first arm is to be rotatable about the first and second pivots, and where the first and second skins are to at least partially define an exterior of the vehicle, placing a second arm between a third pivot of the first skin and a fourth pivot of the second skin, where the second arm is rotatable about the third and fourth pivots, and rotatably coupling a closeout to the first and second skins at fifth and sixth pivots, respectively, of the closeout, where the closeout is rotatable about the fifth and sixth pivots.

An example non-transitory machine readable medium comprises instructions, which when executed, cause a processor to at least determine a flight condition of a vehicle, calculate an adjustment of an airfoil of the vehicle based on flight input and the determined flight condition, and direct an actuator to adjust a shape of the airfoil based on the calculated adjustment, where the shape of the airfoil is adjusted by the actuator moving at least one arm of a plurality of arms extending between pivots of first and second skins of the airfoil.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Adaptive airfoils are disclosed. Some known vehicles employ an airfoil to affect lift caused by a flow of fluid moving over an aerodynamic surface. The airfoil can significantly impact the lift of a vehicle and, in turn, movement and aerodynamic performance of the vehicle. Particularly, geometry and/or design parameters of the airfoil can greatly affect maneuverability and performance of the vehicle.

Examples disclosed herein enable a relatively high degree of maneuverability and condition-specific adaptability by implementing airfoils (e.g., chamber airfoils) that are shape adjustable. In particular, examples disclosed herein affect a shape of an airfoil and, thus, lift generated by the airfoil by implementing multiple rotatable arms (e.g., links, pivoting arms, etc.) positioned between (e.g., extending between) first and second aerodynamic skins (e.g., upper and lower aerodynamic skins of an aerodynamic structure). Further, a closeout is rotatably coupled to the first and second skins (e.g., skin cams, flexible skins), both of which are able to exhibit flexure during movement. As a result, the shape of the airfoil can be greatly altered, thereby enabling a large degree of control in maneuvering the vehicle.

In some examples, the closeout is rotatably coupled to distal ends of the first and second skins. In some examples, at least one of the aforementioned rotatable arms and/or the closeout is operatively coupled to a movement line (e.g., a tension line, a movable cable, etc.). In some examples, the rotatable arms are generally c-shaped with corners to guide the movement line. In some examples, the rotatable arms have different lengths. For example, a rotatable arm closer to the closeout may have a shorter length than another rotatable arm further away from the closeout. In some examples, the closeout exhibits a wedge-like or triangular shape (e.g., a wedge shape or wedge-like shape that converges toward a trailing edge of an aerodynamic structure).

As used herein, the term "airfoil" refers to a component, structure, aerodynamic feature and/or assembly used to affect a lift of a vehicle (e.g., a ratio of lift to drag of the vehicle), which may be manned or unmanned. Accordingly, the term "airfoil" can refer to a chambered airfoil that defines and/or includes an internal chamber within. As used herein, the term "skin" refers to a surface, wall and/or contour of a vehicle that at least partially defines an exterior (e.g., an exterior surface, an exterior wall, etc.) of the vehicle. As used herein, the terms "arm" and "rotatable arm" refer to a structure, device, assembly and/or component implemented to support and drive movement of another component by a rotational and/or translational movement.

Figure 1:
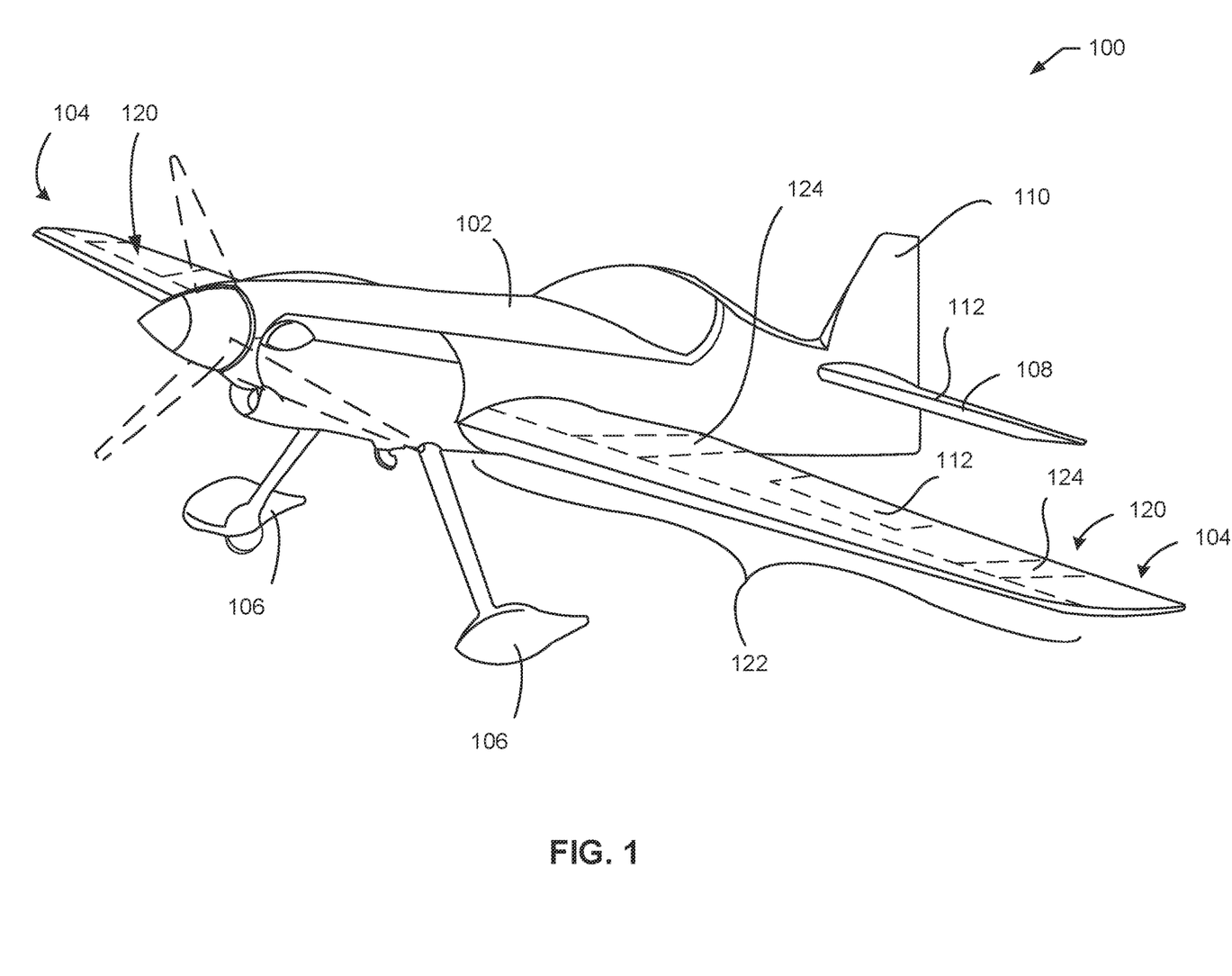
FIG. 1 is an aircraft in which examples disclosed herein can be implemented.

FIG. 1 is an aircraft 100 in which examples disclosed herein can be implemented. The aircraft 100 of the illustrated example includes a fuselage 102, wings 104, landing supports 106, horizontal stabilizers 108, a tail fin 110 and control surfaces 112. In this example, the aircraft 100 is manned. In other examples, however, the aircraft 100 can be implemented as an unmanned aerial vehicle (UAV). Examples disclosed herein can also be implemented on any type of vehicle, manned or unmanned (e.g., submarines, watercraft, spacecraft, etc.).

To control flight of the aircraft 100, the control surfaces 112 in combination with airfoils, such as the wings 104, alter the lift and pitch of the aircraft 100. For example, any of the control surfaces 112 of the illustrated example may be independently moved (e.g., deflected) to control the load distribution in different directions over the wings 104, thereby directing movement of the aircraft 100.

Examples disclosed herein enable shapes of airfoils and/or aerodynamic structures of the aircraft 100 to be adjusted to enable a relatively high degree of control of the aircraft 100. Particularly, examples disclosed herein can be used in conjunction with the control surfaces 112 to increase a maneuverability of the aircraft 100. In the illustrated example, at least portions of the wings 104 are implemented as adaptive airfoils (e.g., adaptive chamber airfoils, shape changing airfoils, variable airfoils, etc.) 120. In particular, a full lengthwise span 122 or sections or bands 124 can be adjustable in shape (e.g., an entire span of the wing 104 is shape variable, multiple ones of the shape variable sections 124 are placed onto one of the wings 104). However examples disclosed herein can be implemented on any other appropriate aerodynamic structure or portion of the aircraft 100 (e.g., the horizontal stabilizers 108, the tail fin 110, the fuselage 102, etc.).

While examples disclosed herein are shown and described in the context of aircraft, examples disclosed herein can be implemented with any appropriate application, including but not limited to propellers, windmills, hydrofoils, sails, turbines (e.g., power generation turbines), conveyor belts, etc. Further, examples disclosed herein can be implemented with any type of vehicle.

Figure 2:
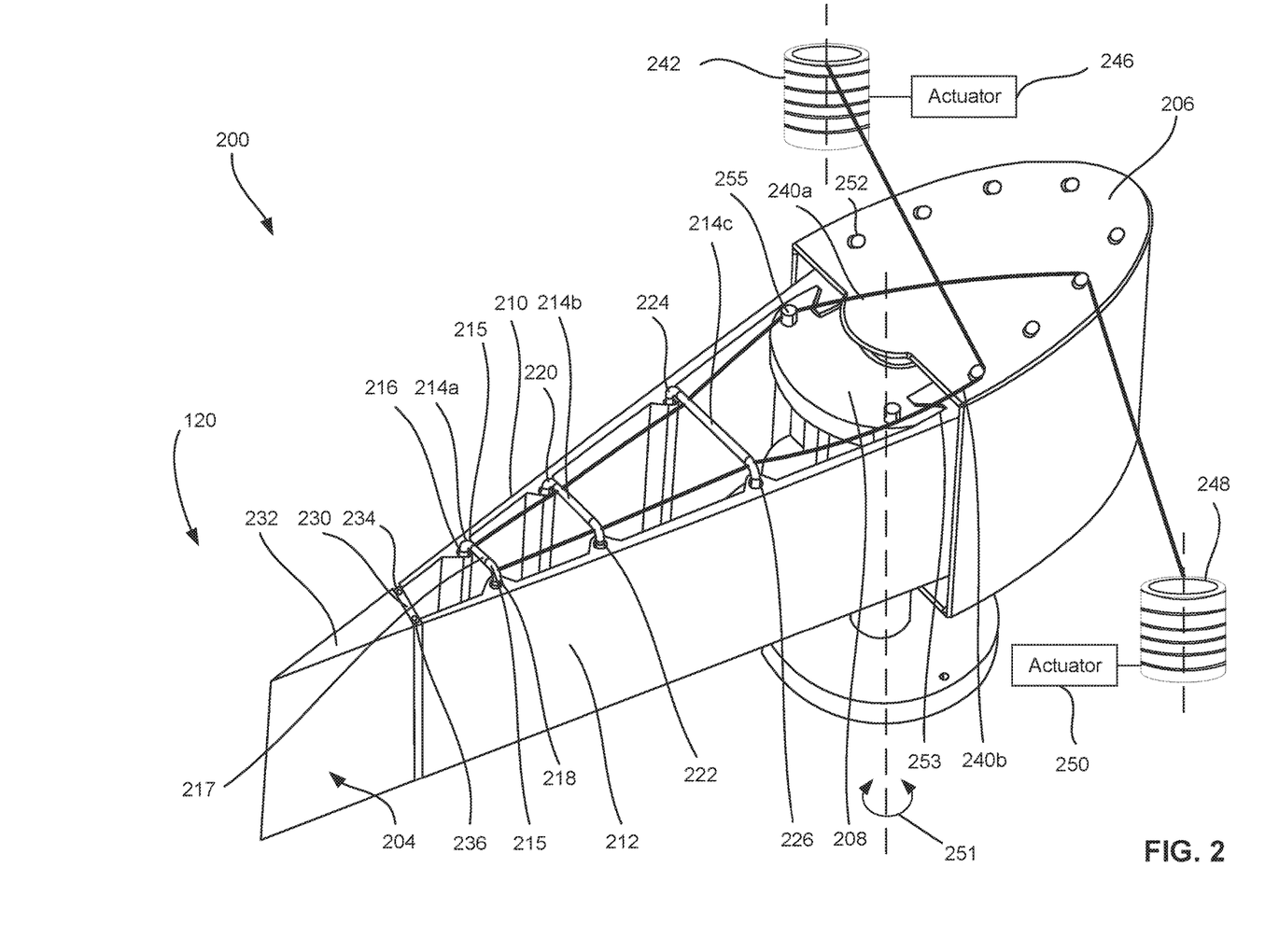
FIG. 2 is a perspective view of an example adaptive airfoil system in accordance with teachings of this disclosure.

FIG. 2 is a perspective view of the example adaptive airfoil system (e.g., an adaptive chamber airfoil system) 200 in accordance with teachings of this disclosure. The adaptive airfoil 200 of the illustrated example is implemented on the wing 104 shown in FIG. 1 and includes the aforementioned airfoil 120. The example airfoil 120 includes a closeout (e.g., a closeout skin) 204, a nose block (e.g., a leading edge surface, a frontal skin, etc.) 206, a spar 208, a first skin (e.g., an upper fairing, an upper skin, an upper fairing skin, etc.) 210, a second skin (e.g., a lower fairing, a lower skin, a lower fairing skin, etc.) 212 and arms (e.g., linkage arms, links, rotating arms, etc.) 214 (hereinafter 214a, 214b, 214c, etc.) with respective bends 215 and spines 217. In this example, the first and second skins 210, 212, as well as the closeout 204, at least partially define an exterior of the aircraft 100.

In the illustrated example, the arm 214a extends between a pivot 216 defined by the first skin 210 and a pivot (e.g., a ball joint pivot, a rotational pivot, etc.) 218 defined by the second skin 212. Further, the arm 214b extends between a pivot 220 defined by the first skin 210 and a pivot 222 defined by the second skin 212. Likewise, the arm 214c between a pivot 224 defined by the first skin 210 and a pivot 226 defined by the second skin 212.

The closeout 204 of the illustrated example is generally wedge shaped or triangular in profile (in the view of FIG. 2). Particularly, the closeout 204 converges in size and area along a general direction away from the nose block 206. In this example, the closeout includes a base 230 and converging distal portion 232. Further, the example closeout 204 includes a pivot 234 that is rotatably coupled to the first skin 210 and, similarly, a pivot 236 that is rotationally coupled to the second skin 212. In some examples, at least one movement line 240 (hereinafter 240a, 240b, etc.) is implemented to drive movement of the skins 210, 212, the closeout 204 and/or at least one of the arms 214a, 214b, 214c. In this particular example, the movement line 240b is operatively coupled to a tensioner (e.g., a reel) 242 which, in turn, is driven by an actuator (e.g., a motor, a servomotor, a solenoid, a transducer, etc.) 246. Likewise, the movement line 240a is operatively coupled to a tensioner 248 which, in turn, is driven by an actuator 250. As can be seen in the illustrated example of FIG. 2, the arms 214a, 214b, 214c are generally c-shaped and inserted into the associated pivots 216, 218, 220, 222, 224, 226. Further, being generally c-shaped enables the arms 214a, 214b, 214c to guide and/or restrain the movement lines 240a, 240b. In particular, the aforementioned bends 215 of the arms 214a, 214b, 214c can guide and/or restrain the movement lines 240a, 240b.

To enable movement of the skins 210, 212 and the closeout 304, the example arms 214a, 214b, 214c are rotatably coupled to the pivots 216, 218, 220, 222, 224, 226 at their distal ends. Further, the first and second skins 210, 212 are relatively flexible and/or movable, thereby enabling the airfoil 120 to undergo a significant shape change while still defining an internal chamber or cavity therein. In the illustrated example of FIG. 2, the movement lines 240a, 240b are coupled to the arm 214a proximate the bends 215 and, as a result, rotation of the arm 214a moves the skins 210, 212 along with the closeout 204, thereby causing flexure of at least one of the skins 210, 212, both of which may be at least partially composed of a flexible material, such as carbon fiber or fabric, for example. In other words, the example arm 214a operates as an input arm to displace and flex the skins 210, 212. However, in other examples, other arms and/or the closeout 204 are driven by the movement lines 240a, 240b. Additionally or alternatively, at least one of the skins 210, 212 is driven by the movement lines 240a, 240b. To facilitate movement of the skins 210, 212 and the closeout 204, the arm 214a, which is closer to the closeout 204 than the arm 214b, has a shorter overall length than the arm 214b. Likewise, the arm 214b has a shorter overall length than the arm 214c.

In the illustrated example, the nose block 206 can rotate relative to the spar 208, as generally indicated by arrows 251. In particular, movement and/or flexure of the first and second skins 210, 212 causes rotational movement of the nose block 206 due to the first and second skins 210. 212 being coupled (e.g., fixed, rotationally coupled) to the nose block 206 at their proximal ends opposite the closeout 204. In this example, notches 253 receive tabs or protrusions 255 to restrict a rotational displacement range of the nose block 206. Accordingly, the airfoil 120 can be adjusted between positive and negative cambers. In some other examples, the nose block 206 remains stationary relative to the spar 208.

To drive movement of the skins 210, 212 along with the closeout 204, the actuator 246 causes rotational movement of the tensioner 242 and, in turn, the movement line 240b, which is operatively coupled to the arm 214a. Further, the actuator 250 causes rotational movement of the tensioner 248 and, thus, the movement line 240a. In other examples, a single one of the movement lines 240 is used to rotate the arm 214a (e.g. in combination with a single actuator, spring and/or reel). In some such examples, the movement line 240 may be spring-loaded (e.g., rotationally spring-loaded, longitudinally spring-loaded, etc.).

In some examples, the movement lines 240a, 240b are guided by guides (e.g., guideposts, tether posts, pulleys, etc.) 252 of the nose block 206. In some examples, the spar 208 rotates and/or is displaced relative to the nose block 206 when the first and second skins 210, 212 are displaced and/or caused to flex by the movement lines 240a, 240b. In some examples, at least one of the tensioners 242, 248 is spring-loaded to provide torsional resistance. In some other examples, the closeout 204 is not wedge-shaped (e.g., the closeout 204 resembles a flat wall or surface instead). In some examples, the nose block 206 is at least partially composed of metal (e.g., a corrosion-resistant metal). In some examples, at least two of arms 214a, 214b, 214c are moved and/or driven independently of one another.

Figure 3:
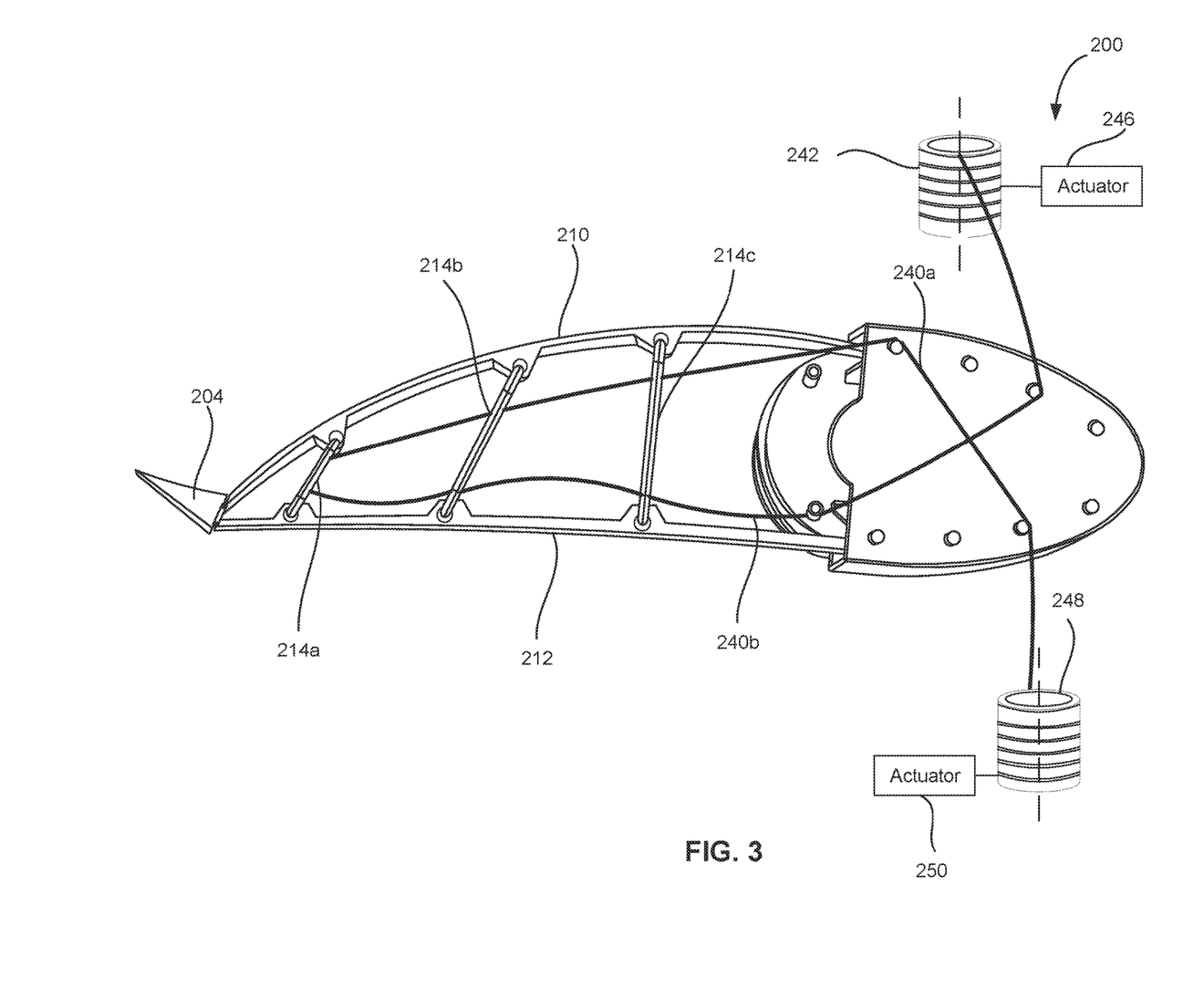
FIG. 3 is a side view of the example adaptive airfoil system of FIG. 2 shown in a positive lift flow configuration.

FIG. 3 is a side view of the example adaptive airfoil system 200 of FIG. 2 shown in a positive lift flow configuration. In the illustrated example of FIG. 3, the actuator 250 drives the tensioner 248 to cause the movement line 240a to pull on the arm 214a while the actuator 246 drives the tensioner 242 to cause the movement line 240b to relax (e.g., the movement line 240b has slack), thereby causing the arm 214a to rotate. As a result of the rotation of the arm 214a, the first skin 210 flexes (e.g., elastically flexes) and causes the closeout 304 to pivot relative to the first and second skins 210, 212, and rotate upward (in the view of FIG. 3). Further, in this example, the arms 214b, 214c rotate to accommodate the flexure of the first skin 210.

Figure 4:
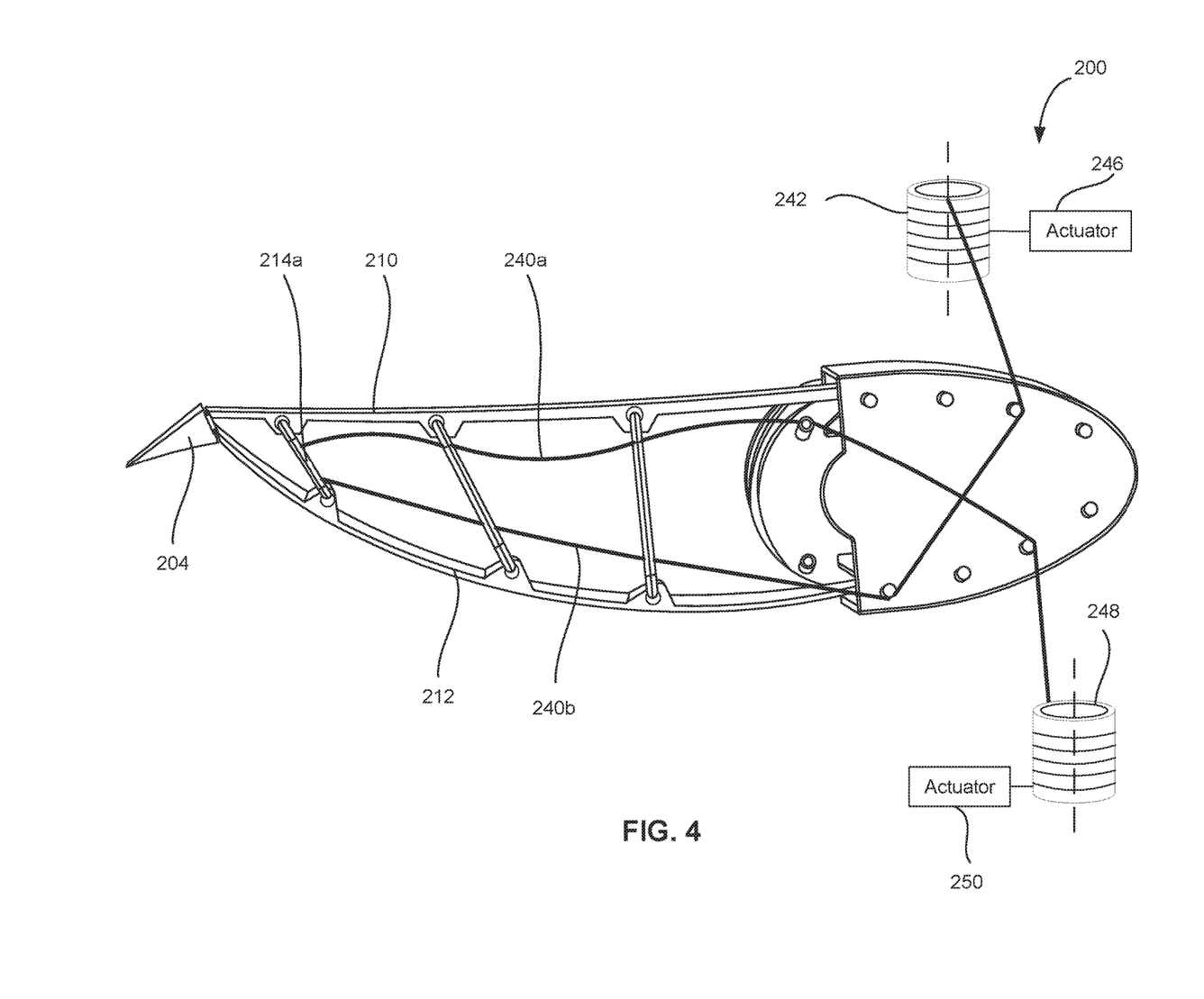
FIG. 4 is a side view of the example adaptive airfoil system of FIGS. 2 and 3 shown in a negative lift flow configuration.

FIG. 4 is a side view of the example adaptive airfoil system 200 of FIGS. 2 and 3 shown in a negative lift flow configuration. In contrast to the example configuration shown in FIG. 3, the actuator 246 drives the tensioner 242 to cause the movement line 240b to be pulled instead of the movement line 240a. Particularly, the actuator 246 causes the movement line 240b to be in tension while the actuator 250 drives the tensioner 248 to allow the movement line 240a to be relaxed. As a result, the arm 214a is pivoted in a different direction from that shown in FIG. 3 and the second skin 212 exhibits a significant amount of flexure and the closeout 204 is angled downward (in the view of FIG. 4). In the illustrated example, the first skin 210 does not exhibit a significant amount of flexure.

Figure 5:
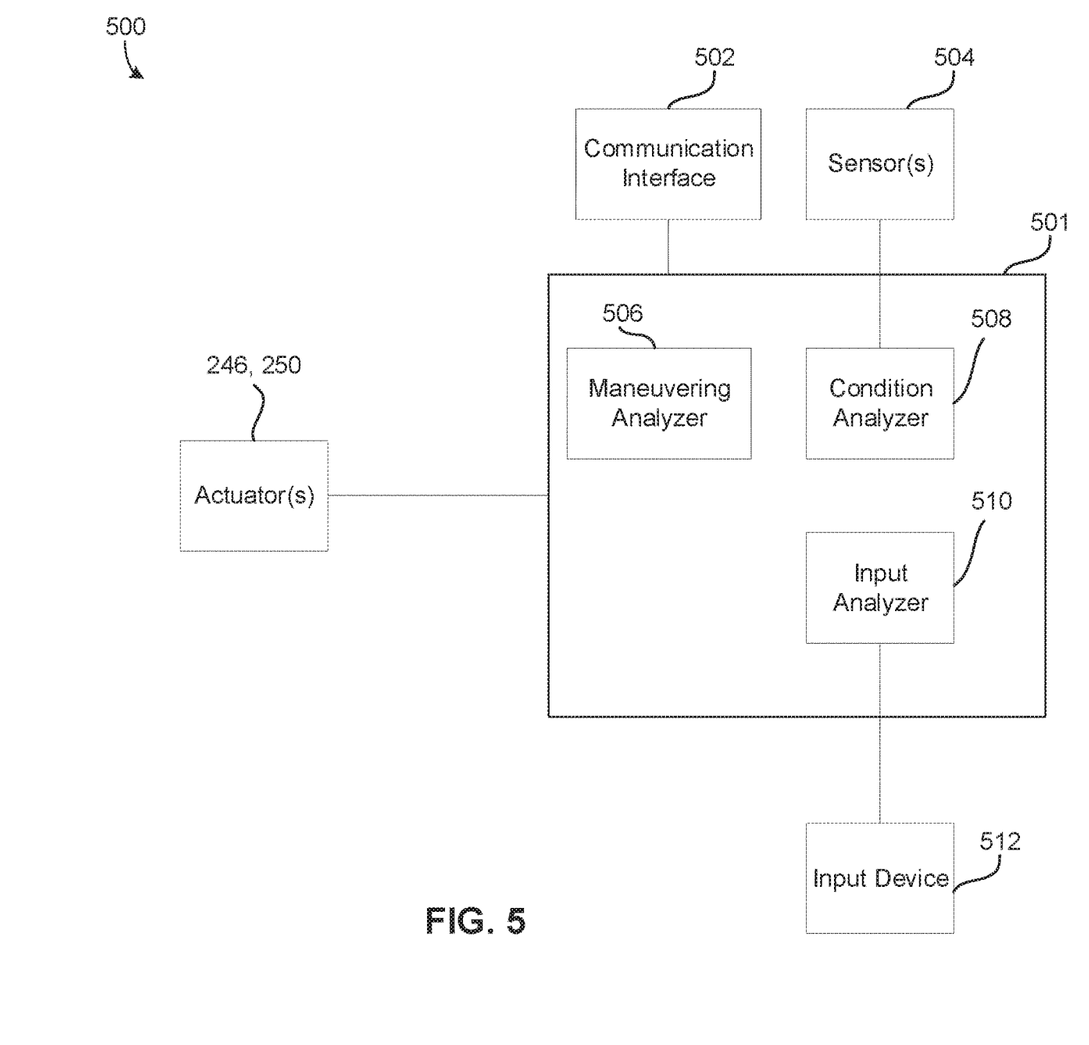
FIG. 5 is a schematic overview of an example adaptive airfoil control system to implement examples disclosed herein.

FIG. 5 is a schematic overview of an example adaptive airfoil control system 500 to implement examples disclosed herein. The adaptive airfoil control system 500 of the illustrated example includes an airfoil shape analyzer 501, which is communicatively coupled to a communication interface 502, a sensor(s) 504 and the actuators 246, 250. In turn, the example airfoil shape analyzer 501 includes a maneuvering analyzer 506, a condition analyzer 508, and an input analyzer 510. In some examples, the airfoil shape analyzer 501 and/or the input analyzer 510 is communicatively coupled to an input device 512.

The communication interface 502 of the illustrated example interfaces with sensors and/or control systems of the aircraft 100. In this example, the communication interface 502 receives signals related to desired flight parameters, a condition of the aircraft 100 and/or sensor data associated with the aircraft 100, which may be received from the sensor(s) 504.

The example condition analyzer 508 determines a condition of the aircraft 100. In this example, the condition analyzer 508 utilizes sensor data from the sensor(s) 504, as well as data from flight instrumentation of the aircraft 100 to determine the condition of the aircraft 100. The condition may include, but is not limited to, a velocity, an attitude, an altitude, a fuel fill level, a payload weight, etc.

The maneuvering analyzer 506 determines and/or calculates a desired shape change of the airfoil 120. For example, the maneuvering analyzer 506 calculates a flight maneuvering path and/or a desired lift for the aircraft 100, and an associated shape change of the airfoil 120. In some examples, the maneuvering analyzer 506 calculates multiple possible shape changes of the airfoil 120 and selects one of the possible shape changes (e.g., based on an efficiency and/or effectiveness analysis, etc.). Additionally or alternatively, the maneuvering analyzer 506 determines a desired rate of movement of the shape change of the airfoil 120. In some examples, the flight maneuvering path and/or the desired lift is calculated at least partially based on the determined condition of the aircraft 100 from the condition analyzer 508. Additionally or alternatively, the flight maneuvering path and/or the desired lift is calculated based on flight input received from the input device 512. In some examples, the maneuvering analyzer 506 determines different rotations of the arms 214a, 214b, 214c to achieve the desired shape change of the airfoil 120 (e.g., the arms 214a, 214b, 214c are rotated independently of one another).

In some examples, the input analyzer 510 is implemented to receive, interpret and/or analyze inputs (e.g., input data) received from the input device 512 and/or cockpit instrumentation of the aircraft 100. In this example, the inputs correspond to pilot or control system driven inputs received from the cockpit of the aircraft 100.

While an example manner of implementing the adaptive airfoil control system 500 of FIG. 5 is illustrated in FIG. 5, one or more of the elements, processes and/or devices illustrated in FIG. 5 may be combined, divided, re-arranged, omitted, eliminated and/or implemented in any other way. Further, the example maneuvering analyzer 506, the example condition analyzer 508 and/or, more generally, the example adaptive airfoil control system 500 of FIG. 5 may be implemented by hardware, software, firmware and/or any combination of hardware, software and/or firmware. Thus, for example, any of the example maneuvering analyzer 506, the example condition analyzer 508, the example input analyzer 510 and/or, more generally, the example adaptive airfoil control system 500 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example maneuvering analyzer 506, the example condition analyzer 508, and/or the example input analyzer 510 is/are hereby expressly defined to include a non-transitory computer readable storage device or storage disk such as a memory, a digital versatile disk (DVD), a compact disk (CD), a Blu-ray disk, etc. including the software and/or firmware. Further still, the example adaptive airfoil control system 500 of FIG. 5 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
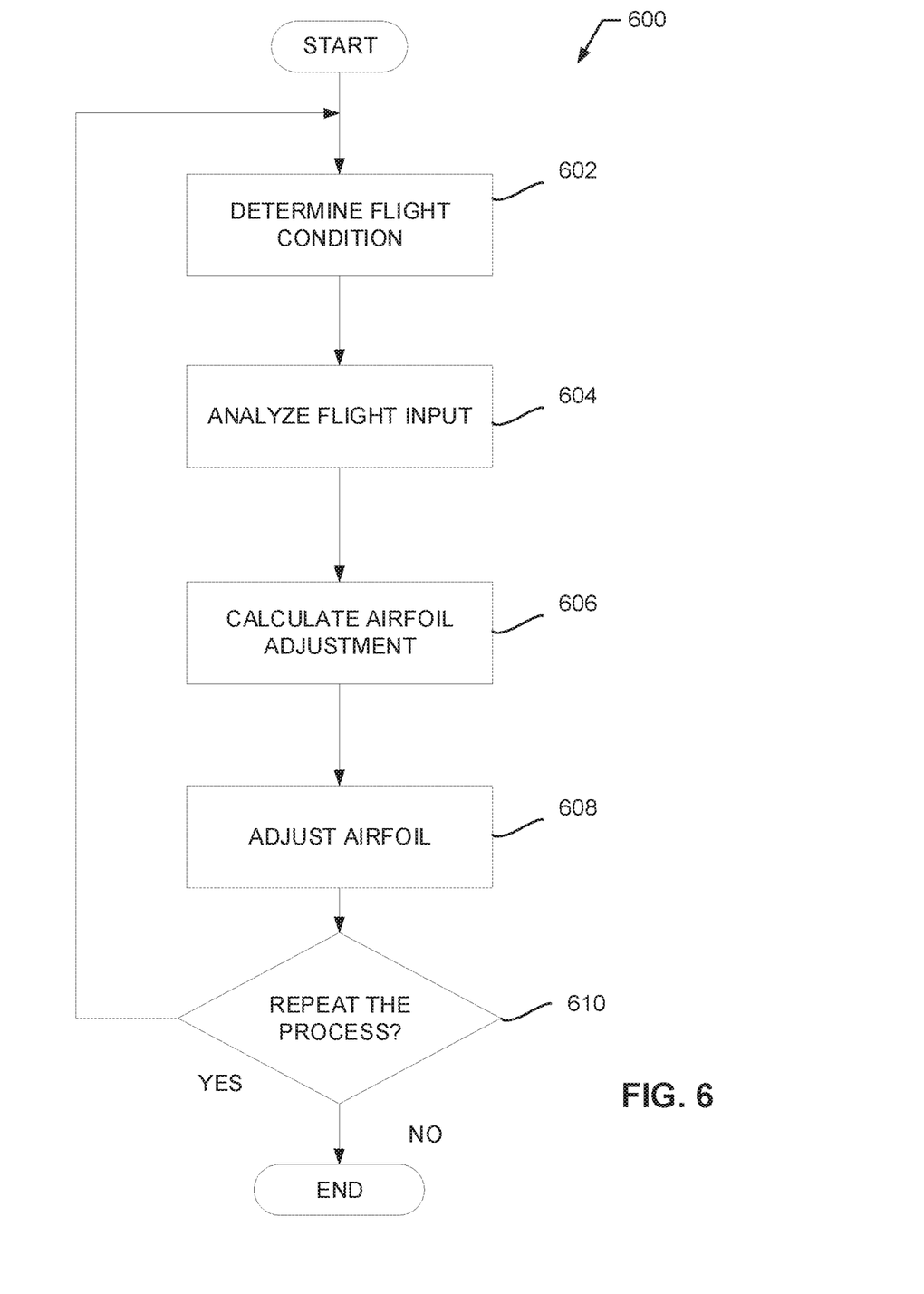
FIG. 6 is a flowchart representative of machine readable instructions which may be executed to implement the example adaptive airfoil system of FIG. 2 and/or the example adaptive airfoil control system of FIG. 5.
Figure 7:
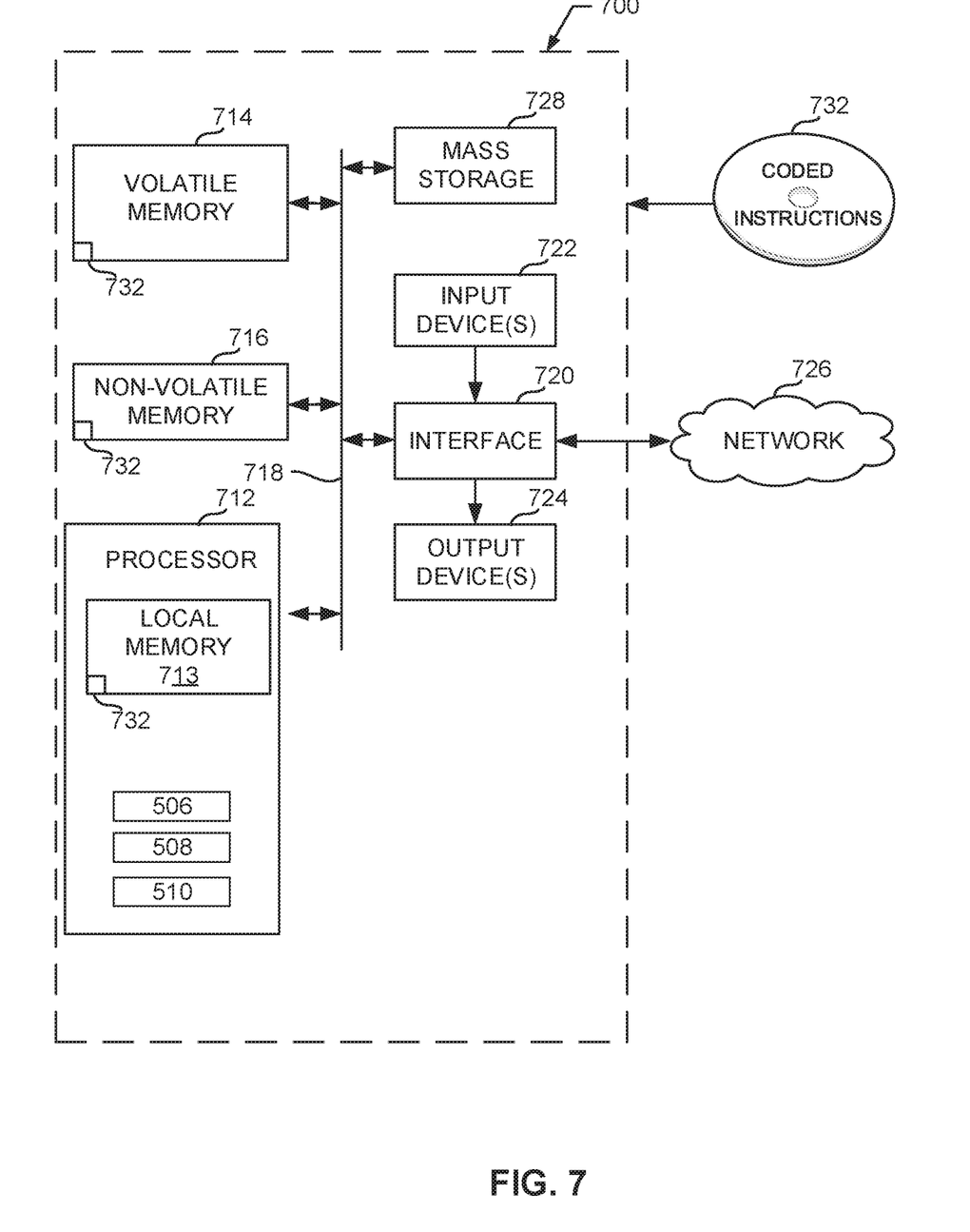
FIG. 7 is a block diagram of an example processing platform structured to execute the instructions of FIG. 6 to implement the example adaptive airfoil system of FIG. 2 and/or the example adaptive airfoil control system of FIG. 5.

A flowchart representative of example hardware logic, machine readable instructions, hardware implemented state machines, and/or any combination thereof for implementing the adaptive airfoil control system 500 of FIG. 5 is shown in FIG. 6. The machine readable instructions may be one or more executable programs or portion(s) of an executable program for execution by a computer processor such as the processor 712 shown in the example processor platform 700 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example adaptive airfoil control system 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 600 of FIG. 6 begins as the aircraft 100 is being flown. In the illustrated example, a shape of the airfoil 120 is being adjusted to alter flight dynamics of the aircraft 100. Particularly, a lift of the aircraft 100 (e.g., an amount of lift of the aircraft 100, a direction of overall lift of the aircraft 100, etc.) is to be adjusted based on the varied shape of the airfoil 120.

At block 602, the condition analyzer 508 utilizes data from the sensor(s) 504 to determine a flight condition of the aircraft 100. In particular, the condition analyzer 508 analyzes data pertaining to speed, attitude, altitude, weather/air conditions, etc. of the aircraft 100.

At block 604, the input analyzer 510 analyzes flight input from the input device 512 and/or cockpit instrumentation of the aircraft 100. In some examples, the input analyzer 510 calculates a desired condition (e.g., a desired speed, attitude and/or altitude, a desired flight state, etc.) of the aircraft 100 based on the flight input.

At block 606, the maneuvering analyzer 506 of the illustrated example calculates an airfoil adjustment (e.g., an adjusted airfoil shape, a desired deformation of the airfoil 120, etc.). In this examples, the airfoil adjustment is calculated based on the flight input and/or the flight condition (e.g., a desired direction and/or magnitude of lift) associated with the aircraft 100.

At block 608, the example maneuvering analyzer 506 causes the actuator(s) 246, 250 to adjust the airfoil 120. In the illustrated example, at least one of the actuator(s) 246, 250 is moved to vary a shape of the airfoil 120 based on the calculated airfoil adjustment.

At block 610, the maneuvering analyzer 506 and/or the condition analyzer 508 determines whether to the repeat the process. This determination can be based on whether further shape adjustments of the airfoil 120 are necessitated (e.g., determined whether the current airfoil shape maintains the aircraft 100 within a desired threshold range for a performance parameter). If the process is to be repeated (block 610), control of the process returns to block 602. Otherwise, the process ends.

FIG. 7 is a block diagram of an example processor platform 700 structured to execute the instructions of FIG. 6 to implement the adaptive airfoil control system 500 of FIG. 5 The processor platform 700 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example maneuvering analyzer 506, the example condition analyzer 508 and the example input analyzer 510.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 6 may be stored in the mass storage device 728, in the volatile memory 714, in the non-volatile memory 716, and/or on a removable non-transitory computer readable storage medium such as a CD or DVD.

Figure 8:
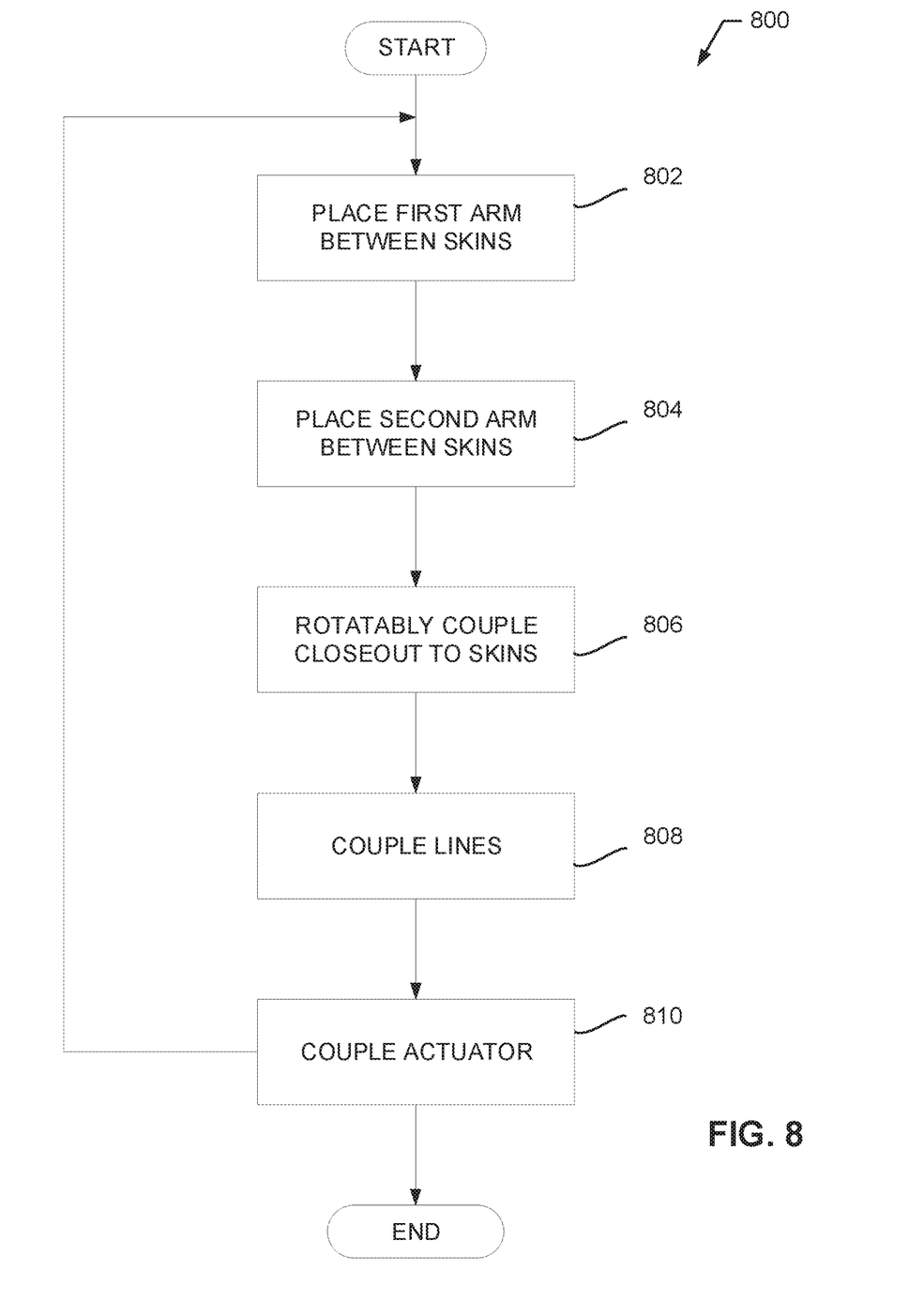
FIG. 8 is a flowchart representative of an example method to produce examples disclosed herein.

FIG. 8 is a flowchart representative of an example method 800 to produce examples disclosed herein. In the illustrated example, the airfoil 120 is being produced for use with a vehicle.

At block 802, the first arm 214*a* is placed to extend between (e.g., operatively coupled between) the first and second skins 210, 212, respectively. In this example, the arm 214*a* is placed relatively closer to the closeout 204 than the arm 214*b*.

At block 804, the second arm 214*b* is placed to extend between (e.g., operatively coupled between) the first and second skins 210, 212, respectively. In this example, the arm 214*b* has a greater length than that of the arm 214*b*.

At block 806, the example closeout 204 is rotatably coupled to distal ends of the first and second skins 210, 212. In particular, the closeout 204 can rotatably pivot relative to the distal ends of the first and second skins 210, 212. In other examples, the closeout 204 is not rotatably coupled to the distal ends of the first and second skins 210, 212 (e.g., the closeout 204 is attached at intermediate locations of the first and second skins 210, 212).

At block 808, in some examples, the movement lines 240*a*, 240*b* are coupled to at least one of the arms 214*a*, 214*b*, 214*c*. In some other examples, the movement lines 240*a*, 240*b* are coupled to the closeout 204. In some examples, the movement lines 240*a*, 240*b* are coupled to different ones of the arms 214*a*, 214*b*, 214*c*.

At block 810, at least one actuator (e.g., the actuators 246, 250) is coupled to one or more of the movement lines 240*a*, 240*b* and the process ends. In other examples, the movement lines 240*a*, 240*b* are not implemented and the at least one actuator is coupled to at least one of the arms 214*a*, 214*b*, 214*c* to cause movement thereof.

Example 1 includes an airfoil for use with a vehicle. The airfoil includes first and second skins at least partially defining an exterior of the vehicle, where the first skin includes first and second pivots, and where the second skin includes third and fourth pivots, a first arm extending between the first and third pivots, the first arm rotatable about the first and third pivots, a second arm extending between the second and fourth pivots, the second arm rotatable about the second and fourth pivots, and a closeout including fifth and sixth pivots rotatably coupled to the first and second skins, respectively.

Example 2 includes the airfoil as defined in example 1, further including a first movement line operatively coupled to the first pivot, and a second movement line operatively coupled to the second pivot.

Example 3 includes the airfoil as defined in example 2, where the first and second arms are c-shaped and include respective corners to guide the first and second movement lines.

Example 4 includes the airfoil as defined in example 1, further including a nose block operatively coupled to the first and second skins, the nose block to be rotatable about a spar.

Example 5 includes the airfoil as defined in example 1, where the closeout includes a wedge that converges along a direction away from the fifth and sixth pivots.

Example 6 includes the airfoil as defined in example 1, where the first skin defines an upper surface of the airfoil, and wherein the second skin defines a lower surface of the airfoil.

Example 7 includes the airfoil as defined in example 1, where the first arm is at a first distance to the closeout and the second arm is at a second distance to the closeout greater than the first distance, and where the first arm has a first length shorter than a second length of the second arm.

Example 8 includes the airfoil as defined in example 1, where the fifth and sixth pivots are rotationally coupled to distal ends of the first and second skins, respectively.

Example 9 includes a method of producing an adaptive airfoil for use with a vehicle. The method includes placing a first arm between a first pivot of a first skin and a second pivot of a second skin, where the first arm is rotatable about the first and second pivots, and where the first and second skins are to at least partially define an exterior of the vehicle, placing a second arm between a third pivot of the first skin and a fourth pivot of the second skin, where the second arm is rotatable about the third and fourth pivots, and rotatably coupling a closeout to the first and second skins at fifth and sixth pivots, respectively, of the closeout, where the closeout is rotatable about the fifth and sixth pivots.

Example 10 includes the method as defined in example 9, further including operatively coupling an actuator to at least one of the first or second arms.

Example 11 includes the method as defined in example 10, further including operatively coupling at least one movement line between the actuator and the at least one of the first or second arms.

Example 12 includes the method as defined in example 11, where the at least one movement line is placed to be guided by corners of at least one of the first or second arms.

Example 13 includes the method as defined in example 10, further including operatively coupling at least one movement line between the actuator and the closeout.

Example 14 includes the method as defined in example 9, where the first arm is positioned at a shorter distance to the closeout than the second arm, and where the first arm includes a first length shorter than a second length of the second arm.

Example 15 includes the method as defined in example 9, where the fifth and sixth pivots are coupled to distal ends of the first and second skins, respectively.

Example 16 includes a non-transitory machine readable medium comprising instructions, which when executed, cause a processor to at least determine a flight condition of a vehicle, calculate an adjustment of an airfoil of the vehicle based on flight input and the determined flight condition, and direct an actuator to adjust a shape of the airfoil based on the calculated adjustment, wherein the shape of the airfoil is adjusted by the actuator moving at least one arm of a plurality of arms extending between pivots of first and second skins of the airfoil.

Example 17 includes the non-transitory machine readable medium as defined in example 16, where the instructions cause the processor to analyze flight input to determine a desired flight state of the vehicle.

Example 18 includes the non-transitory machine readable medium as defined in example 17, where the instructions cause the processor to calculate the adjustment of the airfoil based on the desired flight state of the vehicle.

Example 19 includes the non-transitory machine readable medium as defined in example 16, where the vehicle includes an aircraft, and wherein the flight condition includes a speed, an attitude and an altitude of the aircraft.

Example 20 includes the non-transitory machine readable medium as defined in example 16, where the actuator is caused to adjust the shape of the airfoil by causing flexure of at least one of the first or second skins.

From the foregoing, it will be appreciated that example methods, apparatus and articles of manufacture have been disclosed that enable increase maneuverability of a vehicle, such as an automobile, a watercraft or an aircraft, for example.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure. While examples disclosed herein are shown in the context of aircraft, examples disclosed herein can be applied to any other appropriate application and/or vehicle (e.g., a spoiler of an automobile, an external component of a watercraft or submarine, a hovercraft, etc.).

What is claimed is:

1. An airfoil for use with a vehicle, the airfoil comprising:
first and second skins at least partially defining an exterior of the vehicle, the first skin including first and second pivots, the second skin including third and fourth pivots;
a first arm extending between the first and third pivots, the first arm rotatable about the first and third pivots;
a second arm extending between the second and fourth pivots, the second arm rotatable about the second and fourth pivots;
a closeout including fifth and sixth pivots rotatably coupled to the first and second skins, respectively;
a first movement line operatively coupled to the first pivot; and
a second movement line operatively coupled to the third pivot, wherein the first and second arms are c-shaped and include respective corners to guide the first and second movement lines.

2. The airfoil as defined in claim 1, further including a nose block operatively coupled to the first and second skins, the nose block to be rotatable about a spar.

3. The airfoil as defined in claim 1, wherein the closeout includes a wedge that converges along a direction away from the fifth and sixth pivots.

4. The airfoil as defined in claim 1, wherein the first skin defines an upper surface of the airfoil, and wherein the second skin defines a lower surface of the airfoil.

5. The airfoil as defined in claim 1, wherein the first arm is at a first distance to the closeout and the second arm is at a second distance to the closeout greater than the first distance, and wherein the first arm has a first length shorter than a second length of the second arm.

6. The airfoil as defined in claim 1, wherein the fifth and sixth pivots are rotationally coupled to distal ends of the first and second skins, respectively.

7. The airfoil as defined in claim 1, wherein the first and second skins are flexible such that movement of at least one of the first or second arms causes at least one of the first or second skins to exhibit a curved surface.

8. The airfoil as defined in claim 7, wherein the first and second skins include at least one of carbon fiber or fabric.

9. A method of producing an adaptive airfoil for use with a vehicle, the method comprising:
placing a first arm between a first pivot of a first skin and a second pivot of a second skin, the first arm rotatable about the first and second pivots, the first and second skins to at least partially define an exterior of the vehicle;
placing a second arm between a third pivot of the first skin and a fourth pivot of the second skin, the second arm rotatable about the third and fourth pivots;
rotatably coupling a closeout to the first and second skins at fifth and sixth pivots, respectively, of the closeout, wherein the closeout is rotatable about the fifth and sixth pivots;
operatively coupling a first movement line to the first pivot; and
operatively coupling a second movement line to the second pivot, wherein the first and second arms are c-shaped and include respective corners to guide the first and second movement lines.

10. The method as defined in claim 9, further including operatively coupling an actuator to at least one of the first or second arms.

11. The method as defined in claim 10, further including operatively coupling at least one movement line between the actuator and the at least one of the first or second arms.

12. The method as defined in claim 11, wherein the first movement line is placed to be guided by a first corner of the first arm and the second movement line is to be guided by a second corner of the first arm.

13. The method as defined in claim 10, further including operatively coupling the first and second movement lines to the actuator and the closeout.

14. The method as defined in claim 9, wherein the first arm is positioned at a shorter distance to the closeout than the second arm, and wherein the first arm includes a first length shorter than a second length of the second arm.

15. The method as defined in claim 9, wherein the fifth and sixth pivots are coupled to distal ends of the first and second skins, respectively.

16. A non-transitory machine readable medium comprising instructions, which when executed, cause a processor to at least:
determine a flight condition of a vehicle;
calculate an adjustment of an airfoil of the vehicle based on flight input and the determined flight condition; and
direct an actuator to adjust a shape of the airfoil based on the calculated adjustment, wherein the shape of the airfoil is adjusted by the actuator moving at least one arm of a plurality of arms extending between first and second pivots of first and second skins, respectively, of the airfoil, wherein a first movement line is operatively coupled to the first pivot; and wherein a second movement line operatively coupled to the second pivot, wherein the at least one arm of the arms is c-shaped and includes respective corners to guide the first and second movement lines.

17. The non-transitory machine readable medium as defined in claim 16, wherein the instructions cause the processor to analyze flight input to determine a desired flight state of the vehicle.

18. The non-transitory machine readable medium as defined in claim 17, wherein the instructions cause the processor to calculate the adjustment of the airfoil based on the desired flight state of the vehicle.

19. The non-transitory machine readable medium as defined in claim 16, wherein the vehicle includes an aircraft, and wherein the flight condition includes a speed, an attitude and an altitude of the aircraft.

20. The non-transitory machine readable medium as defined in claim 16, wherein the actuator is caused to adjust the shape of the airfoil by causing flexure of at least one of the first or second skins.

21. A method of adjusting a shape of an airfoil of an aircraft, the method comprising:

determining an adjustment of the airfoil; and moving, based on the determined adjustment, at least one of a plurality of arms extending between a first pivot of a first skin of the airfoil and a second pivot of a second skin of the airfoil, wherein a first movement line is operatively coupled to the first pivot;

wherein a second movement line is operatively coupled to the second pivot, and wherein the at least one of the arms is c-shaped and includes respective corners to guide the first and second movement lines.

22. The method as defined in claim 21, wherein moving the at least one of the arms includes causing a flexure of at least one of the first or second skins.

23. The method as defined in claim 21, further including determining a flight condition of the aircraft, and wherein determining the adjustment of the airfoil is based on the flight condition.

24. The method as defined in claim 23, wherein determining the adjustment of the airfoil is further based on a flight input.

25. The method as defined in claim 21, wherein moving the at least one of the arms includes moving at least one of the first or second movement lines to pivot the at least one of the arms.

\* \* \* \* \*